(12) United States Patent
Klewer et al.

(10) Patent No.: US 11,597,298 B2
(45) Date of Patent: Mar. 7, 2023

(54) SPRAYING WATER IN RAM AIR FOR FUEL CELL POWER SYSTEMS IN AIRCRAFT

(71) Applicant: Airbus Operations GmbH, Hamburg (DE)

(72) Inventors: Guido Klewer, Hamburg (DE); Kurtus Hancock, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 0 days.

(21) Appl. No.: 17/389,575

(22) Filed: Jul. 30, 2021

(65) Prior Publication Data
US 2022/0032818 A1 Feb. 3, 2022

(30) Foreign Application Priority Data

Aug. 3, 2020 (EP) .................................... 20315376

(51) Int. Cl.
  B60L 58/33 (2019.01)
  H01M 8/04029 (2016.01)
  H01M 8/04007 (2016.01)
  H01M 8/04701 (2016.01)
  B64D 41/00 (2006.01)

(52) U.S. Cl.
  CPC .......... B60L 58/33 (2019.02); H01M 8/04029 (2013.01); H01M 8/04074 (2013.01); H01M 8/04723 (2013.01); B64D 41/00 (2013.01); B64D 2041/005 (2013.01)

(58) Field of Classification Search
  CPC ............ B60L 58/33; B64D 2041/005; H01M 8/04029; H01M 8/04074; H01M 8/04723
  See application file for complete search history.

(56) References Cited

U.S. PATENT DOCUMENTS

2016/0036071 A1* 2/2016 Klewer ............ H01M 8/04044
                                                              429/435
2018/0236894 A1    8/2018 Bandai et al.

FOREIGN PATENT DOCUMENTS

JP   2001313054 A    11/2001
JP   2002-343396   * 11/2002
JP   2002343396 A    11/2002
JP   2020068112 A    8/2018
JP   2019079650 A    5/2019

OTHER PUBLICATIONS

English translation of JP Publication 2002-343396, Nov. 2002.*
European Search Report; priority document.

* cited by examiner

Primary Examiner — Brittany L Raymond
(74) Attorney, Agent, or Firm — Greer, Burns & Crain, Ltd.

(57) ABSTRACT

A fuel cell power system including at least one fuel cell, a ram air system and a cooling circuit in which coolant is intended to circulate for regulating a temperature of the at least one fuel cell. The cooling circuit comprises a ram air heat exchanger in the ram air system and the ram air system comprises a nozzle. The fuel cell power system further comprises a water tank and the fuel cell power system is arranged to flow water from the water tank to the ram air system so as to spray water in ram air via the nozzle. Thus, dimensioning of the ram air system which includes the ram air heat exchanger is reduced.

11 Claims, 4 Drawing Sheets

SPRAYING WATER IN RAM AIR FOR FUEL CELL POWER SYSTEMS IN AIRCRAFT

CROSS-REFERENCES TO RELATED APPLICATIONS

This application claims the benefit of the European patent application No. 20315376.2 filed on Aug. 3, 2020, the entire disclosures of which are incorporated herein by way of reference.

FIELD OF THE INVENTION

The present invention generally relates to aircraft equipped with at least one fuel cell-based propulsion system and, more particularly, to fuel cell temperature management for maneuvers of such aircraft which require extra electrical power, such as take-off phases.

BACKGROUND OF THE INVENTION

Fuel cell power systems are used with more and more electrical systems in order to supply electrical energy thereto. For instance, such electrical systems are electrical motors used for propulsion of aircraft. Such electrical motors receive electrical energy generated by at least one fuel cell and transform the electrical energy into mechanical energy. The mechanical energy may then be used by propellers to provide propulsion to the aircraft.

Operation of fuel cell power systems generate heat losses. In order to constrain fuel cell power systems temperature within an admissible range for proper operation of the fuel cell power systems, a coolant circulates in a cooling circuit in order to refresh the fuel cell power systems. The coolant heated up by the fuel cell power systems passes through a ram air heat exchanger of a ram air system. Since heat dissipation by the fuel cell power systems varies over operations of the aircraft, the ram air heat exchanger is dimensioned to enable coolant refreshment requirements in electrical energy highly demanding maneuvers of the aircraft. Dimensioning of the ram air system, including dimensioning of the ram air heat exchanger, is thus designed by taking account of most severe operation conditions, typically take-off phases. It has moreover to be considered that during take-off phases, aircraft speed is rather low, which means that the amount of air passing through the ram air system for refreshing the coolant is rather low compared with cruising conditions. It therefore means that the ram air system and the ram air heat exchanger are oversized for cruising, which is the main operation of the aircraft over time. This implies overload and increased drag in cruise.

It is desirable to overcome the aforementioned drawbacks of the prior art. It is more particularly desirable to provide a solution that enables reducing dimensions of the ram air system, including dimensions of the ram air heat exchanger, used for cooling of fuel cell power systems in propulsion of aircraft. It is also desirable to provide a weight-effective and cost-effective solution.

SUMMARY OF THE INVENTION

The present invention concerns a fuel cell system comprising at least one fuel cell, a ram air system and a cooling circuit in which coolant is intended to circulate for regulating temperature of the at least one fuel cell, the cooling circuit comprising a ram air heat exchanger in the ram air system, wherein the ram air system comprises a nozzle, and the fuel cell power system further comprises a water tank and the fuel cell power system is arranged to flow water from the water tank to the ram air system so as to spray water in ram air via the nozzle. Thus, dimensioning of the ram air system which includes the ram air heat exchanger is reduced, since spraying water brings a temperature decrease.

According to a particular embodiment, water resulting from chemical reaction of dihydrogen with dioxygen in the fuel cell is used to supply the water tank.

According to a particular embodiment, the fuel power system further comprises a controller, referred to as cooling controller, and a water flow regulating device configured to regulate temperature of the coolant by adjusting operation of the water flow regulating device According to a particular embodiment, the water flow regulating device is a water pump.

According to a particular embodiment, regulation of water flow from the water tank to the ram air system is performed according to ambient temperature.

According to a particular embodiment, the cooling circuit comprises a bypass valve mixing hot coolant, as heated up by the fuel cell, and refreshed coolant, as output by the ram air heat exchanger, and wherein the cooling controller is configured to further regulate temperature of the coolant by adjusting operation of the bypass valve.

According to a particular embodiment, the cooling controller is configured to operate in a first operating mode when regulating temperature of the coolant according to the first target temperature and to operate in a second operating mode when regulating temperature of the coolant according to the second target temperature, and the cooling controller is configured to switch from the first operating mode to the second operating mode when an event, referred to as first event, is received, wherein the first event indicates that the fuel cell power system should prepare for a highly demanding electrical energy situation or a cooling low availability situation.

According to a particular embodiment, the cooling controller is configured to switch from the second operating mode to the first operating mode when receiving an event, referred to as second event, indicating that the fuel cell power system has authorization to apply nominal operations.

According to a particular embodiment, water spray in ram air is inactivated in the first operating mode and is activated in the second operating mode.

The present invention also concerns an aircraft comprising at least one propulsion system including the aforementioned fuel cell power system.

According to a particular embodiment, the aircraft comprises avionics configured to send the first event to the cooling controller when an upcoming highly demanding electrical energy situation or cooling low availability situation is detected by the avionics.

According to a particular embodiment, the avionics are configured to send the first event in advance of a take-off phase.

According to a particular embodiment, the avionics are configured to send the first event when a TCAS (Traffic Collision Avoidance System) pre-alert or TAWS (Terrain Awareness Warning System) alert is triggered.

According to a particular embodiment, the avionics are configured to send the first event when an approach of a runway for landing is initiated.

BRIEF DESCRIPTION OF THE DRAWINGS

The characteristics of the invention will emerge more clearly from a reading of the following description of an example of embodiment, said description being produced with reference to the accompanying drawings, among which.

DETAILED DESCRIPTION OF THE PREFERRED EMBODIMENTS

Figure 1:
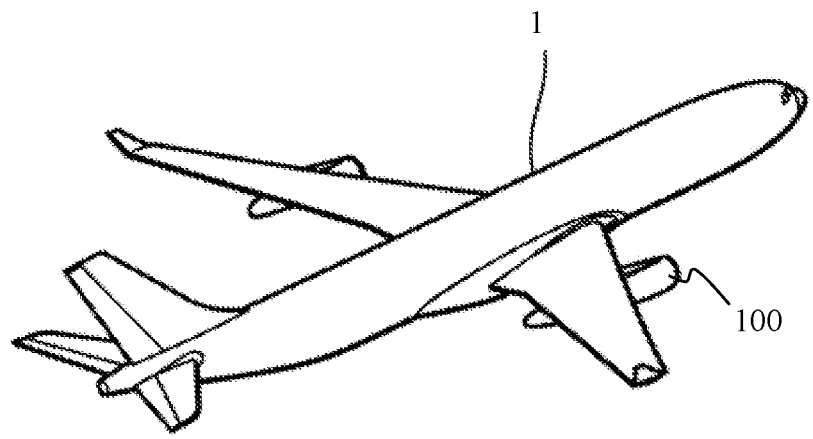
FIG. 1 schematically represents an aircraft.

FIG. 1 schematically represents an aircraft 1 equipped with at least one propulsion system 100. Two propulsion systems 100 are illustrated in FIG. 1, one on each wing of the aircraft 1. One or more of the at least one propulsion system 100 comprises a fuel cell power system connected to at least one electrical motor that converts electrical energy into mechanical energy that is then transferred to a propeller for contributing to propulsion of the aircraft 1. By receiving mechanical energy from the electrical motor, the propeller rotates and thus enables propulsion of the aircraft 1.

Figure 2:
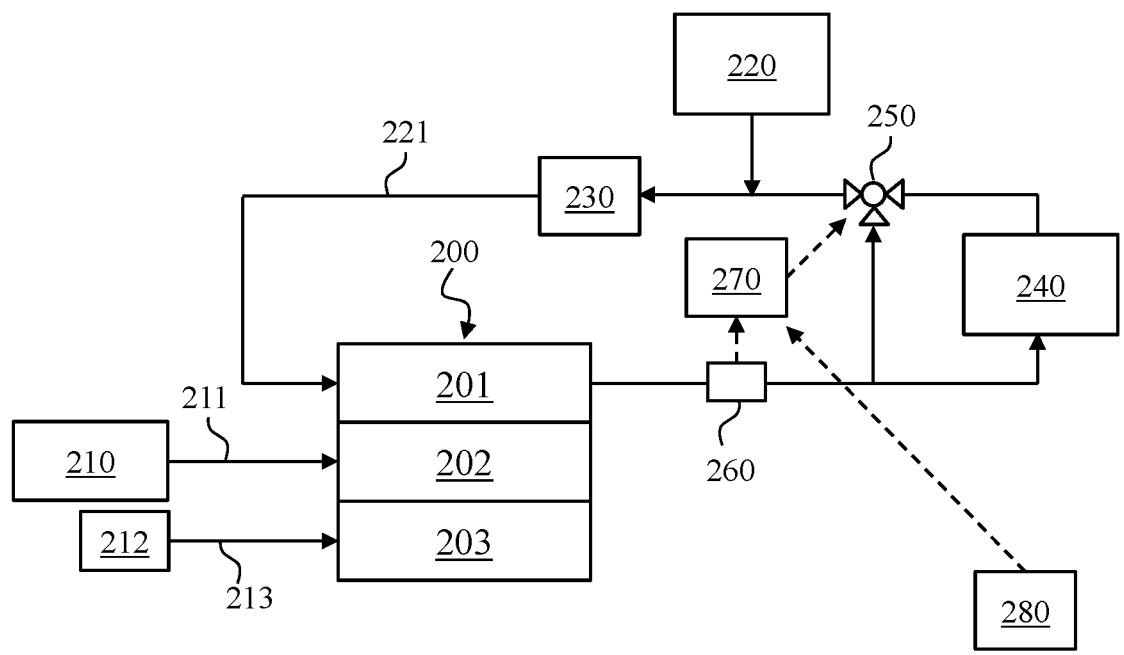
FIG. 2 schematically represents a fuel cell power system for providing electrical energy to an electrical motor of a propulsion system of the aircraft, in a first embodiment.

As shown in FIG. 2, the fuel cell power system comprises at least one fuel cell 200. The fuel cell power system may comprise plural fuel cells coupled together, for instance, in the form of fuel cell stack. Each fuel cell 200 comprises an anode 202 and a cathode 203. The anode 202 is supplied with dihydrogen from a dihydrogen tank 210 via a dihydrogen supply pipe 211. The cathode 203 is supplied with dioxygen, for instance from an air inlet 212, via a dioxygen supply pipe 213. Each fuel cell 200 comprises a cooling stage 201 via which the fuel cell 200 is refreshed by a coolant. The coolant comprises, for instance, of water with glycol.

The coolant circulates in a cooling circuit including a coolant tank 220 and a coolant pump 230 for enabling circulation of the coolant through the cooling circuit. The cooling circuit further comprises a ram air heat exchanger 240, via which at least part of the coolant heated up by the fuel cell 200 circulates. Part of the coolant heated up by the fuel cell 200 may be routed to a bypass valve 250 of the cooling circuit, thus bypassing the ram air heat exchanger 240. The bypass valve 250 thus enables mixing hot coolant, as heated up by the fuel cell 200, and refreshed coolant, as output by the ram air heat exchanger 240. Control of the bypass valve 250, namely of the part of coolant that bypasses the ram air heat exchanger 240 and respectively of the part of coolant that goes through the ram air heat exchanger 240, thus enables adapting the temperature of the coolant (re)injected in the fuel cell 200 by the cooling circuit, and consequently enables adapting the temperature of the fuel cell 200.

Control of the bypass valve 250 is performed by a cooling controller 270 due to a temperature sensor 260 installed in the cooling circuit, preferably at an output of the cooling stage 201 of the fuel cell 200. The temperature sensor 260 measures temperature and provides information representative of the temperature of the coolant to the cooling controller 270. The cooling controller 270 consequently adjusts operation of the bypass valve 250 by using predefined rules and/or abacuses and/or look-up tables LUT, as a function of the information provided by the temperature sensor 260.

The cooling controller 270 regulates the temperature of the coolant, so as to consequently regulate the temperature of the fuel cell 200, as a function of a target temperature. The cooling controller 270 uses a first target temperature, unless the cooling controller 270 receives an event indicating that the fuel cell power system should prepare for a highly demanding electrical energy situation or a cooling low availability situation; in this case, the cooling controller 270 uses a second target temperature lower than the first target temperature. For instance, such an event is a command starting the fuel cell power system. This allows a starting of the fuel cell power system in a configuration wherein the second target temperature is used, which is particularly useful for preparing the aircraft 1 for take-off after being started. Indeed, in such a case, since the speed of the aircraft 1 when taxiing is rather low and ambient temperature is rather high compared with cruising conditions, the fuel cell power system faces the cooling low availability situation. Moreover, taking-off is a highly demanding electrical energy situation.

The second target temperature is reduced compared with the first target temperature, namely decreased by a predefined difference value. For example, the predefined difference value is 10° C., which means that the second target temperature is lower than the first target temperature by 10° C. The second target temperature is within the operational range of the fuel cell 200, which means that the fuel cell 200 operates correctly at a temperature equal to the second target temperature, without any prejudice on the functioning of the fuel cell 200.

According to a first embodiment, the cooling controller 270 operates in one among at least two operating modes. In a first operating mode, the cooling controller 270 regulates the temperature of the coolant injected in the fuel cell 200 so as to target the first target temperature of the fuel cell 200. Considering that the first target temperature of the fuel cell corresponds to a nominal temperature of the fuel cell 200 under nominal operations, the cooling controller 270 applies the first operating mode in normal cruising conditions of the aircraft 1, and potentially in other conditions not highly demanding in terms of electrical energy. In a second operating mode, the cooling controller 270 regulates the temperature of the coolant injected in the fuel cell 200 so as to target the second target temperature of the fuel cell 200.

It can be understood from the foregoing explanation that the cooling controller 270 differently adjusts operation of the bypass valve 250 according to whether the cooling controller 270 applies the first operating mode or the second operating mode. Namely, the controller 270 adjusts operation of the bypass valve 250 so that the amount of coolant that bypasses the ram air heat exchanger 240 is greater in the first operating mode than in the second operating mode. Other techniques in addition or in replacement of adjusting operation of the bypass valve 250 may be used to differently operate cooling according to whether the first target temperature or the second target temperature is targeted. Water spraying in the ram air is an alternative, which is also disclosed hereafter.

The cooling controller 270 applies the second operating mode by anticipation of a situation highly demanding in terms of electrical energy or of a situation potentially highly demanding in terms of electrical energy. Thus, the cooling controller 270 reduces the temperature of the fuel cell 200 before occurrence of the situation highly demanding in terms of electrical energy. It provides thus a margin (equal to the predefined difference value, e.g., 10° C.) of temperature increase when such a situation effectively occurs. If and when the situation highly demanding in terms of electrical energy occurs (i.e., need for increased propulsion power), the ram air heat exchanger is less solicited since the temperature of the fuel cell 200 has been lowered beforehand Thus, the dimensions of the ram air system, including dimensions of the ram air heat exchanger, are thus reduced.

For deciding to activate the second operating mode, the cooling controller 270 awaits events from an external controller 280. The external controller 280 is part of the aircraft's avionics, typically located in the cockpit of the aircraft 1 or nearby. For example, the external controller 280 is informed by the aircraft's pilots, by actuating a dedicated user interface item in the cockpit (e.g., button) or via a graphical user interface of an Electronic Flight Bag (EFB) connected to the aircraft's avionics, that a situation highly demanding in terms of electrical energy might be encountered. For example, the aircraft's pilots notify the avionics, which transfers information representative thereof to the external controller 280, that a take-off phase is upcoming According to another example, as already mentioned, the second operating mode is activated upon a command starting the fuel cell power system. The external controller 280 notifies the cooling controller 270 and the cooling controller 270 consequently activates the second operating mode. The cooling controller 270 should be notified far enough in advance of the potential occurrence of the situation highly demanding in terms of electrical energy, in order to take into account temperature regulation inertia of the cooling circuit. Events other than events related to take-off phase may trigger the switching from the first operating mode to the second operating mode. According to another example, the external controller 280 notifies the cooling controller 270 when an approach of a runway for landing is initiated, in order to be prepared to a potential go-around maneuver when a landing is aborted. According to another example, the external controller 280 notifies the cooling controller 270 when a TCAS (Traffic Collision Avoidance System) pre-alert or a TAWS (Terrain Awareness Warning System) alert is triggered, in order to be prepared to a potential anti-collision maneuver.

For switching from the second operating mode to the first operating mode, the cooling controller 270 waits to be notified by the external controller 280 that the cooling controller is authorized to apply nominal operations. For example, when the second operating mode has been activated for preparing to a take-off phase, the external controller 280 notifies the cooling controller 270 when take-off phase has been completed. According to another example, when the second operating mode has been activated for preparing for a go-around maneuver, the external controller 280 notifies the cooling controller 270 when landing has been completed. According to yet another example, when the second operating mode has been activated for preparing for an anti-collision maneuver, the external controller 280 notifies the cooling controller 270 when no more TCAS pre-alerts or alerts and/or no more TAWS alerts persist (e.g., upon reception of "Clear of conflict" indication).

As a variant, for switching from the second operating mode to the first operating mode, the cooling controller 270 waits that a timer of predetermined duration has elapsed, wherein the timer is activated when the second operating mode is triggered.

Figure 3:
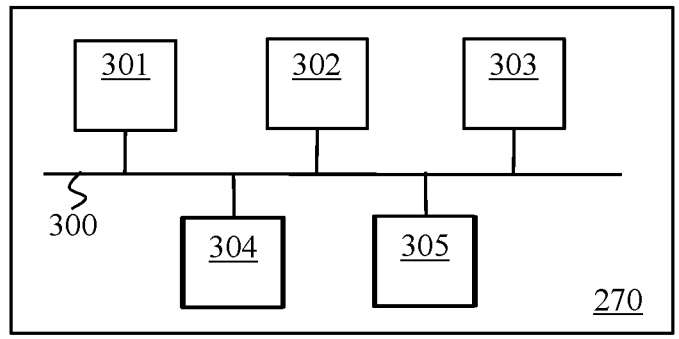
FIG. 3 schematically represents an example of hardware architecture of a controller used for managing cooling in the fuel cell power system.

An example of hardware architecture of the cooling controller 270 is schematically illustrated in FIG. 3. According to the shown example of hardware architecture, the cooling controller 270 comprises at least the following components interconnected by a communications bus 300: a processor, microprocessor, microcontroller or CPU (Central Processing Unit) 301; a RAM (Random-Access Memory) 302; a ROM (Read-Only Memory) 303 or a Flash memory; an HDD (Hard-Disk Drive) or an SD (Secure Digital) card reader 304, or any other device adapted to read information stored on non-transitory information storage medium; and at least one communication interface 305.

CPU 301 is capable of executing instructions loaded into RAM 302 from ROM 303 or from an external memory, such as an SD card via the SD card reader 304. After the cooling controller 270 has been powered on, CPU 301 is capable of reading instructions from RAM 302 and executing these instructions. The instructions form one computer program that causes CPU 301 to perform some or all steps, algorithms and behaviors described herein with respect to the cooling controller 270.

It has to be further understood that the external controller 280 may be designed with identical hardware architecture.

Consequently, it is understood that any and all steps, algorithms and behaviors described herein with respect to either the cooling controller 270 or the external controller 280 may be implemented in software form by execution of a set of instructions or computer program by a programmable computing machine, such as a DSP (Digital Signal Processor) or a microcontroller; or else implemented in hardware form by a machine or a dedicated chip or chipset, such as an FPGA (Field-Programmable Gate Array) or an ASIC (Application-Specific Integrated Circuit). In general, the cooling controller 270 comprises processing electronics circuitry adapted and configured for implementing the relevant steps, algorithms and behaviors described herein with respect to the cooling controller 270. Identically, the external controller 280 comprises processing electronics circuitry adapted and configured for implementing the relevant steps, algorithms and behaviors described herein with respect to the external controller 280.

Figure 4:
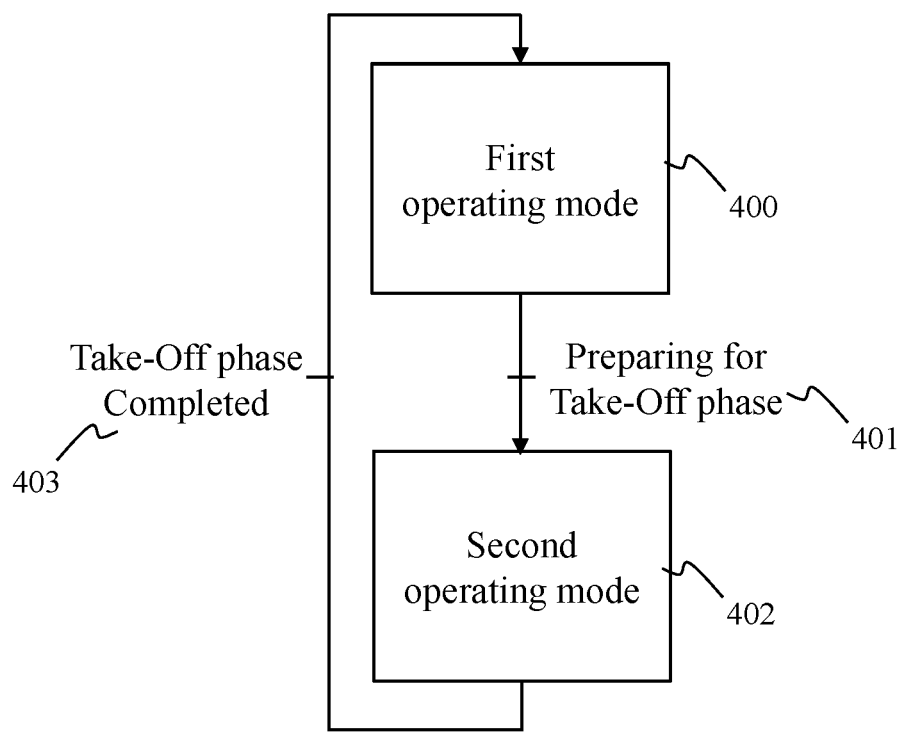
FIG. 4 schematically represents a state machine for managing cooling of the fuel cell power system in a particular embodiment of take-off conditions.

FIG. 4 schematically represents a state machine for managing cooling of the fuel cell power system, in a particular embodiment of take-off conditions. The state machine in FIG. 4 is implemented by the cooling controller 270.

In a state 400, the cooling controller 270 applies the first operating mode. Temperature regulation is performed by the cooling circuit according to the first target temperature of the fuel cell 200.

When an event 401 is received, the second operating mode is triggered and the cooling controller 270 switches to a state 402. The event notifies that the fuel cell power system should be prepared for an upcoming take-off phase. As explained above, the event 401 may notify that the fuel cell power system should be prepared for another type of upcoming maneuver which implies highly demanding electrical energy (increased propulsion power).

In the state 402, the cooling controller 270 applies the second operating mode. Temperature regulation is performed by the cooling circuit according to the second target temperature of the fuel cell 200.

When an event 403 is received, the first operating mode is triggered and the cooling controller 270 returns in the state 400. The event notifies that the take-off phase has been completed. As explained above, the event 403 may notify that the maneuver which implied highly demanding electrical energy has been completed or that the actual conditions no more necessitate that the fuel cell power system be prepared for a maneuver implying highly demanding electrical energy (e.g., the aircraft 1 has landed without any need for a go-around maneuver).

As already mentioned, the state machine in FIG. 4 may be adapted so as to start the fuel cell power system in the second operating mode.

Figure 5A:
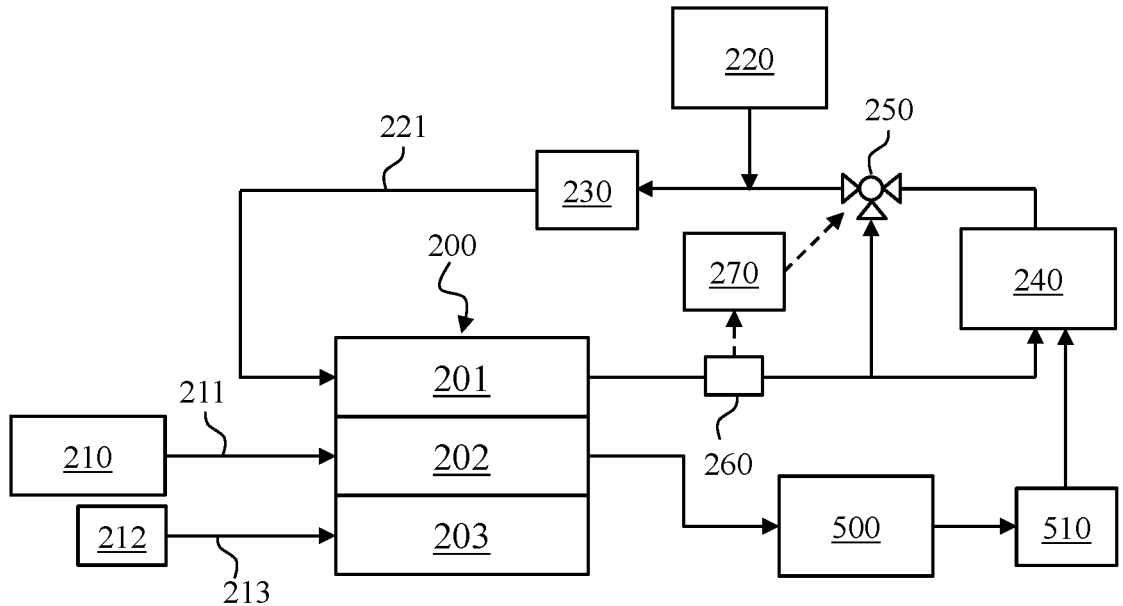
FIG. 5A schematically represents the fuel cell power system, in a second embodiment.

FIG. 5A schematically represents the fuel cell power system, as used in a second embodiment. Compared with the first embodiment, the fuel cell power system comprises a water tank 500 and the fuel cell power system is arranged to flow water from the water tank 500 to the ram air system. To do so, the fuel cell power system may include a water flow regulating device. Let's illustratively consider hereafter that water flow from the water tank 500 to the ram air system is carried out by a water pump 510.

In the scope of FIG. 5A, the cooling controller 270 does not need to be driven by an external controller, such as the external controller 280 in FIG. 2.

The water tank 500 contains water in liquid state. The water circulates from the water tank to the ram air onto the ram air heat exchanger 240 due to the water pump 510. Water resulting from the chemical reaction of dihydrogen with dioxygen in the fuel cell 200 may be used to supply the water tank 500. The ram air system is equipped with a nozzle, and water is thus sprayed in the ram air onto the ram air heat exchanger 240 due to the nozzle. Spraying water in the ram air onto the ram air heat exchanger 240 enables a reduction of the temperature of the coolant circulating through the ram air heat exchanger 240. Thus, the dimensions of the ram air system, including dimensions of the ram air heat exchanger, are thus reduced, since the sprayed water contributes to temperature reduction.

Figure 5B:
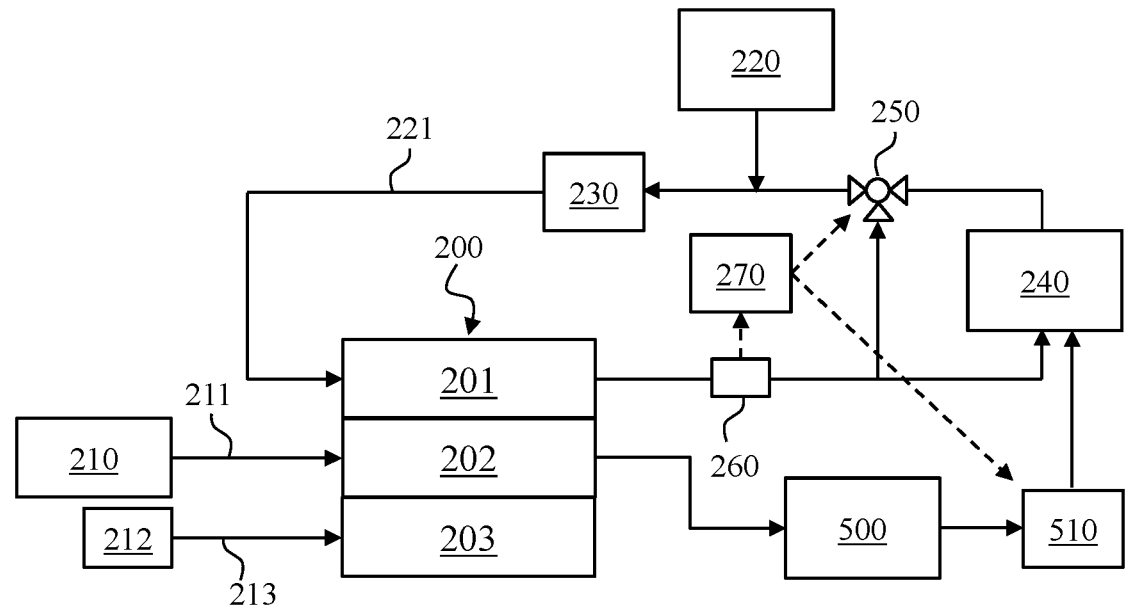
FIG. 5B schematically represents the fuel cell power system, in a third embodiment.

It is considered in the scope of FIG. 5A that water is continuously sprayed in the ram air. Operation of the water pump 510 is, in a particular embodiment, controlled by the cooling controller 270. FIG. 5B schematically represents the fuel cell power system, as used in a corresponding third embodiment.

The cooling controller 270 controls and adjusts the flow of sprayed water in the ram air necessary for reaching a target temperature of the coolant and consequently a target temperature of the fuel cell 200. In other words, when the temperature of the coolant (and consequently of the fuel cell 200) is not sufficiently low, the cooling controller 270 increases the flow of sprayed water in the ram air; and when the temperature of the coolant (and consequently of the fuel cell 200) has reached the target temperature, the cooling controller 270 decreases or ceases the flow of sprayed water in the ram air. A particular embodiment algorithm implemented by the cooling controller 270 is detailed hereafter with respect to FIG. 6.

The cooling controller 270 may thus adjust operation of the bypass valve 250 and/or operation of the water pump 510 for temperature regulation.

In a particular embodiment, the cooling controller 270 adjusts operation of the water pump 510 according to events received from the external controller 280, in order to implement the aforementioned first operating mode and second operating mode, or to contribute thereto. A state machine addressing this aspect is detailed hereafter with respect to FIG. 7.

Figure 6:
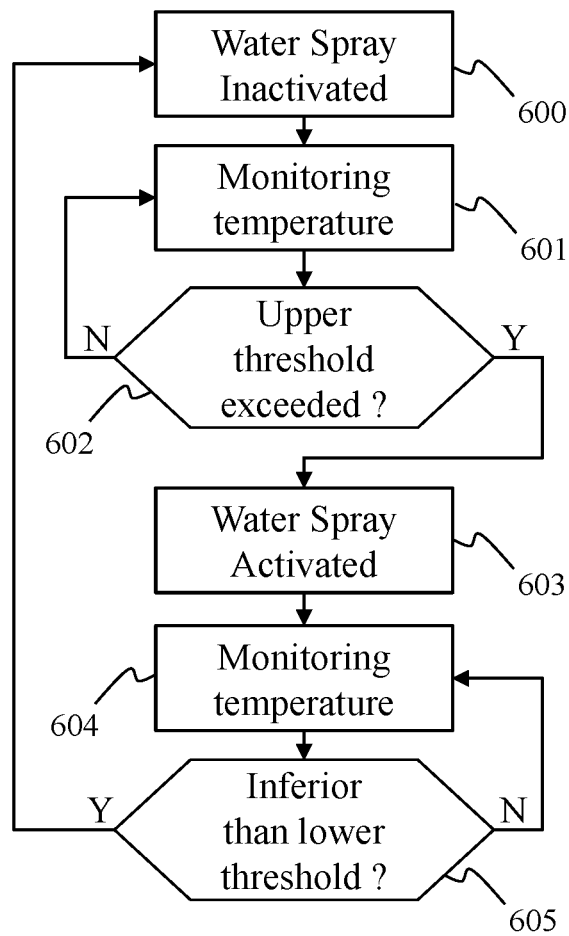
FIG. 6 schematically represents an algorithm for managing cooling of the fuel cell power system, in a particular embodiment.

FIG. 6 schematically represents an algorithm for managing cooling of the fuel cell power system, in a particular embodiment.

In a step 600, the cooling controller 270 performs a temperature regulation of the coolant in the cooling circuit, and, thus, temperature regulation of the fuel cell 200, while the water spray in the ram air is inactivated. In other words, the water pump 510 is off. In a variant, the cooling controller 270 performs temperature regulation of the coolant in the cooling circuit, and, thus, temperature regulation of the fuel cell 200, while the water spray in the ram air is activated in a low spraying mode.

In a step 601, the cooling controller 270 monitors the temperature of the coolant, by receiving and analyzing temperature information provided by the temperature sensor 260.

In a step 602, the cooling controller 270 checks whether or not the monitored temperature exceeds an upper threshold. In the case where the monitored temperature exceeds the upper threshold, a step 603 is performed; otherwise, the step 601 is repeated.

In the step 603, the cooling controller 270 performs temperature regulation of the coolant in the cooling circuit, and, Thus, temperature regulation of the fuel cell 200, while the water spray in the ram air is activated. In other words, the water pump 510 is on. In the variant introduced above with respect to the step 601, the cooling controller 270 performs temperature regulation of the coolant in the cooling circuit, and, thus, temperature regulation of the fuel cell 200, while the water spray in the ram air is activated in a high spraying mode, wherein more water is sprayed in the ram air in the high spraying mode than in the low spraying mode.

In a step 604, the cooling controller 270 monitors temperature of the coolant, by receiving and analyzing temperature information provided by the temperature sensor 260.

In a step 605, the cooling controller 270 checks whether or not the monitored temperature gets lower than a lower threshold, which is inferior to the upper threshold so as to implement hysteresis control. In the case where the monitored temperature gets lower than the lower threshold, the step 600 is performed; otherwise, the step 604 is repeated.

Spraying water in the ram can thus be used to regulate cooling of the fuel cell 200. Spraying water in the ram may thus be used to regulate cooling of the fuel cell 200 as a complement to temperature regulation performed by the cooling controller with the bypass valve 250.

In a particular embodiment, the cooling controller 270 adjusts the flow of water sprayed in the ram air necessary for reaching the first target temperature of the coolant (and consequently of the fuel cell 200) in the first operating mode and adjusts the flow of water sprayed in the ram air necessary for reaching the second target temperature of the coolant (and consequently of the fuel cell 200) in the second operating mode. Temperature regulation due to adjustment of operation of the water pump 510 (i.e., adjustment of the flow of water sprayed in the ram air) may be combined with temperature regulation due to adjustment of operation of the bypass valve 250, as detailed hereafter with respect to FIG. 7.

Figure 7:
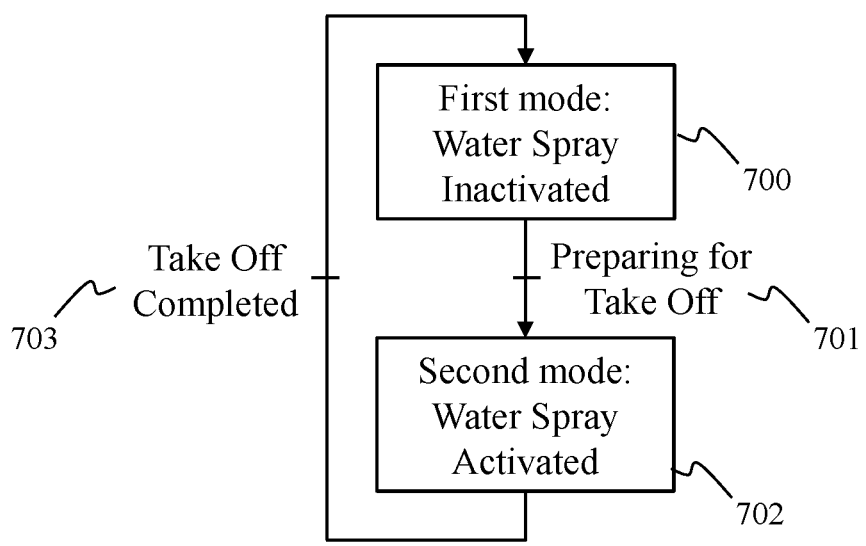
FIG. 7 schematically represents a state machine for managing cooling in take-off conditions, in another particular embodiment.

FIG. 7 schematically represents a state machine for managing cooling in take-off conditions, in another particular embodiment. The state machine in FIG. 7 is implemented by the cooling controller 270.

In a state 700, the cooling controller 270 applies the first operating mode. Temperature regulation is performed by the cooling circuit according to the first target temperature of the fuel cell 200 by operation of the bypass valve 250, while the water spray in the ram air is inactivated. In other words, the water pump 510 is off. In a variant, the water spray in the ram air is activated in the low spraying mode.

When an event 701 is received, the second operating mode is triggered and the cooling controller 270 switches to a state 702. The event notifies that the fuel cell power system should be prepared for an upcoming take-off phase. As explained above with respect to FIG. 2, the event 701 may notify that the fuel cell power system should be prepared for another type of upcoming maneuver which implies highly demanding electrical energy (increased propulsion power).

In the state 702, the cooling controller 270 applies the second operating mode. Temperature regulation is performed by the cooling circuit according to the second target temperature of the fuel cell 200 by operation of the bypass valve 250, while the water spray in the ram air is activated. In other words, the water pump 510 is on. In a variant, the water spray in the ram air is activated in the low spraying mode. Water spray enables speeding up decrease of temperature.

When an event 703 is received, the first operating mode is triggered and the cooling controller 270 returns in the state 700. The event notifies that the take-off phase has been completed. As explained above with respect to FIG. 2, the event 703 may notify that the maneuver which implied highly demanding electrical energy has been completed or that the actual conditions no more necessitate that the fuel cell power system be prepared for a maneuver implying highly demanding electrical energy (e.g., the aircraft 1 has landed without any need for a go-around maneuver).

As already mentioned, the state machine in FIG. 7 may be adapted so as to start the fuel cell power system in the second operating mode.

According to a particular embodiment, the fuel cell power system is arranged such that regulation of water flow from the water tank 500 to the ram air system is performed according to ambient temperature. Thus, extra water may be sprayed in the ram air when ambient temperature imply cooling low availability situation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fuel cell power system comprising
at least one fuel cell,
a ram air system, and
a cooling circuit configured to receive a circulating coolant to regulate a temperature of the at least one fuel cell, the cooling circuit comprising a ram air heat exchanger in the ram air system,
wherein the ram air system comprises a nozzle, and the fuel cell power system further comprises a water tank and the fuel cell power system is arranged to flow water from the water tank to the ram air system so as to spray water in ram air via the nozzle,
wherein the fuel cell power system further comprises a cooling controller and a water flow regulating device, the cooling controller configured to regulate a temperature of the coolant by adjusting operation of the water flow regulating device to regulate a flow of water from the water tank to the ram air system,
wherein the cooling controller is configured to operate in a first operating mode when regulating the temperature of the coolant according to a first target temperature and to operate in a second operating mode when regulating the temperature of the coolant according to a second target temperature which is lower than the first target temperature,
wherein the cooling controller is configured to switch from the first operating mode to the second operating mode when a first event is received, wherein the first event indicates that the fuel cell power system should prepare for highly demanding electrical energy situation or cooling low availability situation, and
wherein the cooling controller is configured such that water spray in ram air is inactivated in the first operating mode and is activated in the second operating mode.

2. The fuel cell power system according to claim 1, wherein water resulting from a chemical reaction of dihydrogen with dioxygen in the fuel cell is used to supply the water tank.

3. The fuel cell power system according to claim 1, wherein the water flow regulating device is a water pump.

4. The fuel cell power system according to claim 1, wherein the cooling controller is configured such that the regulation of water flow from the water tank to the ram air system is performed according to an ambient temperature.

5. The fuel cell power system according to claim 1,
wherein the cooling circuit comprises a bypass valve mixing hot coolant, as heated up by the fuel cell, and refreshed coolant, as output by the ram air heat exchanger, and
wherein the cooling controller is configured to further regulate the temperature of the coolant by adjusting operation of the bypass valve.

6. The fuel cell power system according to claim 1, wherein the cooling controller is configured to switch from the second operating mode to the first operating mode when receiving a second event indicating that the fuel cell power system has authorization to resume nominal operations.

7. An aircraft comprising at least one propulsion system including a fuel cell power system according to claim 1.

8. The aircraft according to claim 7, comprising avionics, wherein the avionics are configured to send the first event to the cooling controller when upcoming highly demanding electrical energy situation or cooling low availability situation is detected by the avionics.

9. The aircraft according to claim 8, wherein the avionics are configured to send the first event in advance of a take-off phase.

10. The aircraft according to claim 8, wherein the avionics are configured to send the first event when a Traffic Collision Avoidance System TCAS pre-alert or Terrain Awareness Warning System TAWS alert is triggered.

11. The aircraft according to claim 8, wherein the avionics are configured to send the first event when an approach of a runway for landing is initiated.

\* \* \* \* \*